Aug. 25, 1959    L. B. BARKER ET AL    2,900,742
EDUCATIONAL GAME FOR TEACHING SPELLING
Filed April 5, 1956
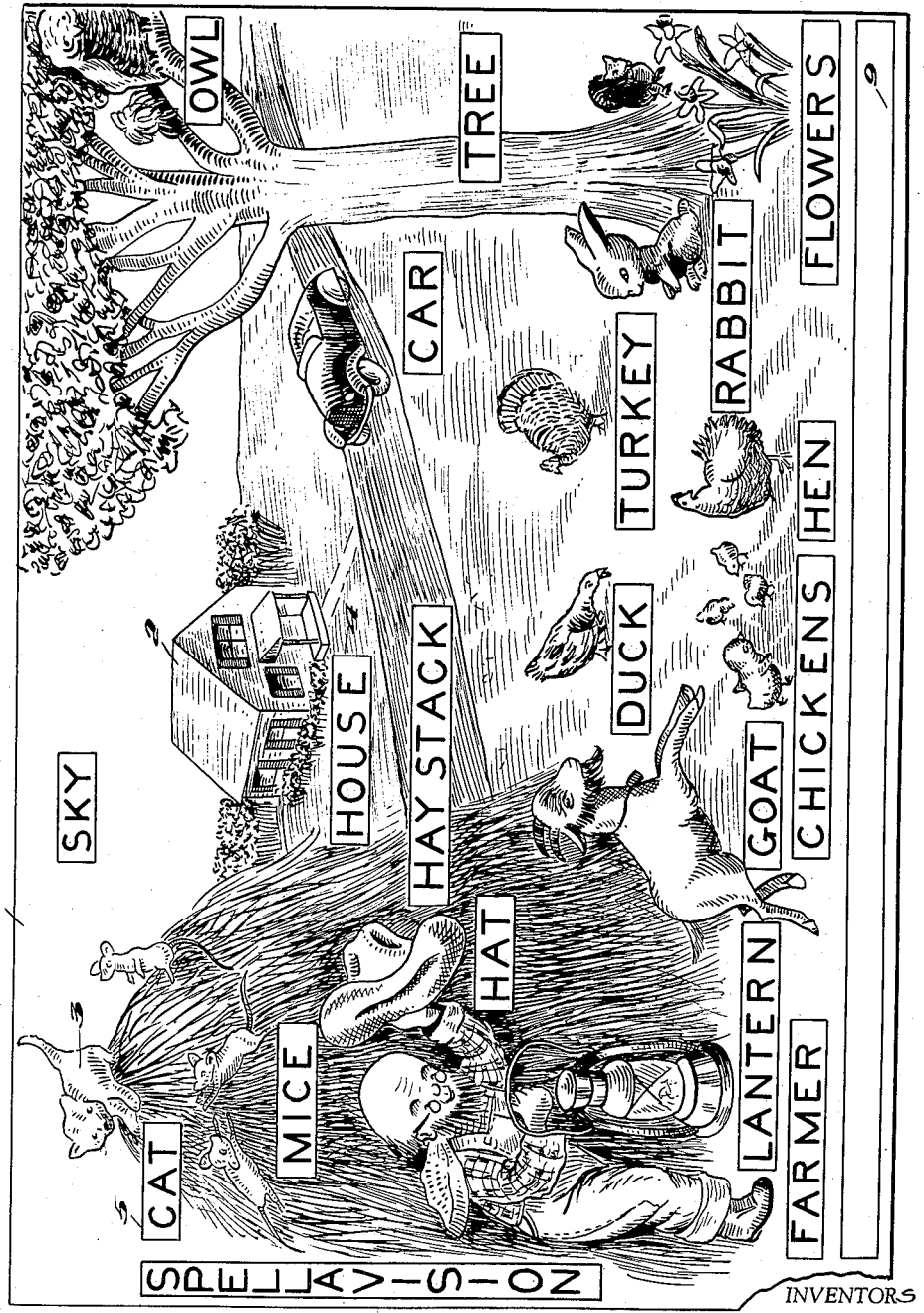
INVENTORS
LYLLIARD B. BARKER
HAROLD BROOKS BAKER,
BY
ATTORNEYS

:::
2,900,742

EDUCATIONAL GAME FOR TEACHING SPELLING

Lylliard B. Barker, Arlington, Va., and Harold Brooks Baker, Washington, D.C.

Application April 5, 1956, Serial No. 576,270

1 Claim. (Cl. 35—35)

This invention relates to a game and more particularly to an educational device which is designed to teach young children to spell.

The value of word and picture association in training a child to spell is well known. Prior art devices have not, however, combined such picture and word associations in such a way that the alphabet may be taught as well as spelling.

The present invention provides a game in which there is provided a game board having a plurality of pictures of various objects thereon. A recess is provided immediately adjacent each picture and within this recess is printed the letters forming the name of the object associated therewith. A plurality of blocks having letters of the alphabet thereon are provided and these blocks are adapted to fit within the recesses on the game board. The object of the game is, of course, to match the various letters forming the words and the person attaining the highest score by completing the most number of words or words having the highest value wins the game. For older children who are learning to spell, the game has obvious value and the game is also useful in teaching the younger child the letters of the alphabet. The blocks may be provided with a magnetically attractable element on the rear face thereof and wands or rods having magnets on the end thereof may be used to select the various blocks.

A primary object of the present invention is to provide an educational game which is useful both in teaching the alphabet and spelling.

Other objects and many of the attendant advantages thereof will become more readily apparent when considered in connection with the accompanying drawing wherein:

Fig. 1 is a plan view of the game board;

Fig. 2 is a perspective view of one of the blocks used in connection with the game; and Fig. 3 is a sectional view through one of the blocks.

There is shown at 1 in Fig. 1 a game board which may be made of any suitable material such as, for example, wood or cardboard. The board is provided with pictures of various objects such as a house 2 and cat 3. It will be appreciated that the objects pictured on the board may be selected at will and that the objects shown in the present drawing are for illustrative purposes only. Adjacent each object pictured on the board there is provided a recess such as, for example, the recess 4 adjacent the picture 2 and the recess 5 adjacent the picture 3. Within such recesses the letters spelling the name of the object are printed.

In Fig. 2 there is shown a block 6 having a letter 7 formed thereon. The blocks are of such a size that they fit within the recesses on the game board and each block will cover a single letter in a recess. The block may be provided with a portion 8, Fig. 3, of magnetically attractable material on the rear face thereof for a purpose which will become apparent more fully hereinafter.

The game is played in the following manner. The blocks 6 are all placed face down and each player is supplied with a rod or wand having a magnet disposed in the end thereof. A play is made by selecting one of the blocks with the wand through attraction by the magnet of the portion 8. The player then places the block within a recess having a corresponding letter. Each of the words appearing on the game board may be given a selected value and an elongated recess 9 may be provided adjacent the lower edge of the game board in which various sentences may be inserted. The player to complete a word receives credit for the value of that word and the player with the highest score wins the game.

It can be readily appreciated that the presently disclosed game is an educational device which serves to teach a child the letters of the alphabet and also assists in training a child to spell.

Obviously, many modifications and variations of the present invention are possible in the light of the above teachings. For example, instead of providing recesses for retention of the blocks, a frame could be placed on the game board to receive the lettered blocks. What is claimed as new and desired to be secured by Letters Patent is:

In an educational device of the character disclosed, a substantially flat board having a plurality of pictures thereon, a rectangular recess of uniform depth disposed adjacent to each of said pictures, a printed word disposed in each of said recesses identifying the adjacent pictures, an elongated rectangular slot of uniform depth adjacent one edge of said board, a plurality of square blocks of uniform shape each having a single letter thereon, said blocks being adapted to fit within said recesses and to overlie said printed words in adjacent relationship whereby words may be formed, and said blocks being adapted to fit within said elongated slot in adjacent relationship whereby sentences may be formed.

References Cited in the file of this patent

UNITED STATES PATENTS

| | | |
|---|---|---|
| 364,845 | Oakley | June 4, 1887 |
| 1,084,370 | Smith | Jan. 13, 1914 |
| 1,085,405 | Dadd | Jan. 27, 1914 |
| 1,110,434 | Garman | Sept. 15, 1914 |
| 1,168,949 | McKittrick | Jan. 18, 1916 |
| 1,273,763 | Garman | July 23, 1918 |
| 1,394,620 | Haupt | Oct. 25, 1921 |
| 1,428,456 | Stranders | Sept. 5, 1922 |
| 2,524,548 | Speirs | Oct. 3, 1950 |
| 2,612,708 | Amsel | Oct. 7, 1952 |
| 2,722,061 | Webster | Nov. 1, 1955 |
| 2,722,754 | Slote | Nov. 8, 1955 |